Patented Jan. 5, 1954

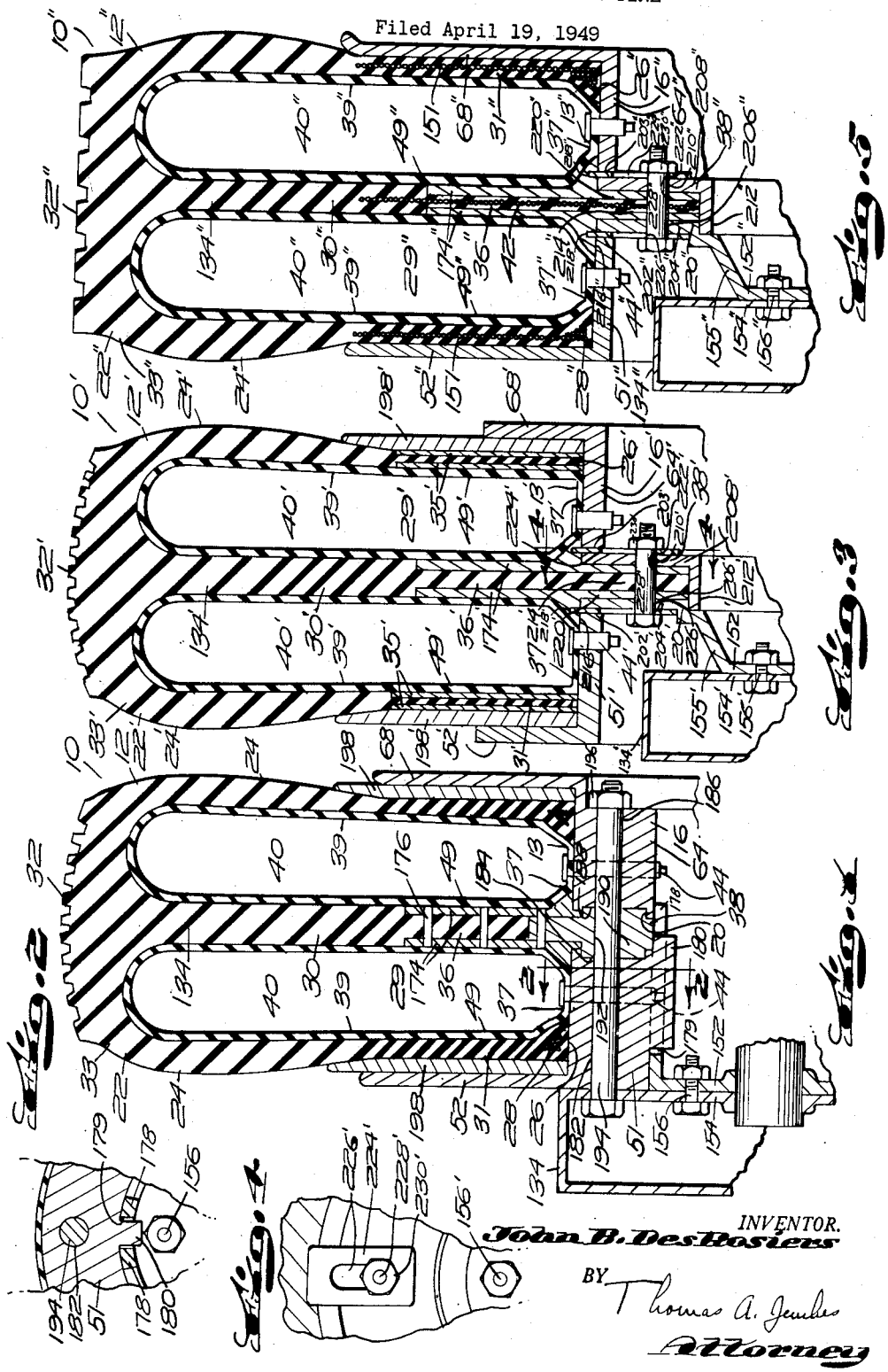

2,664,935

UNITED STATES PATENT OFFICE 2,664,935

LARGE VOLUME MULTICHAMBER TIRE

John B. Des Rosiers, Providence, R. I.

Application April 19, 1949, Serial No. 88,424

5 Claims. (Cl. 152—339)

My invention relates to improvements in pneumatic tires and comprises a multichamber pneumatic tire of a width equal to present day balloon or so-called low pressure cushion tires presenting a large area of contact on the road and comprises the provision of a tire which is preferably at least substantially twice as deep as ordinary tires and adapted to be used on a rim of much smaller radius than present day types of tires. My present invention has the advantageous features of my application for patent for Pneumatic Tire, S. N. 88,425, filed April 19, 1949, combined with the advantageous features shown in my application for patent for Multichamber Pneumatic Tire, S. N. 88,705, filed April 21, 1949, Patent Number 2,641,295, issued June 9, 1953.

I am aware that others have attempted to increase the volumetric size of the tire by providing a groove in a rim of standard radius and permitting a portion of the tube to descend within the groove. I believe I am the first, however, to provide a tire wherein the whole shoe is made of a size not only to fill a groove in the usual sized rim, but also to extend downwardly into the wheel substantially the depth of an ordinary tire thereby with the tire also extending its normal height above the rim at least doubling the amount of air in the tire to add to the cushioning qualities thereof.

Due to the greater volume provided by my tire, a larger deformation of the tire when striking a bump or abutment is required to produce a given change of pressure than would be the case with standard short depth tires which means that a given bump on the road will apply a smaller jolt to the car occupants and due to the fact that a much greater amount of air is present, the tire will be much cooler, due to the fact that the flows of pressure caused by the bump will be distributed throughout a great volume and the friction of the air particles against each other correspondingly lessened thereby, providing much cooler running qualities to the tire in use, preventing any excessive amount of heat to cause any premature deterioration of the tire.

I also suitably modify the rim structure so as to provide a rim of much less radius than usual, but I preferably provide inner and outer flanges up to substantially the height of a standard type of rim to abut the lower portions of the walls of my improved tire substantially up to the height of the standard rim and thereby provide a structure which will positively not pull out.

In accordance with my invention, I provide a pneumatic tire generally oblong in section and having inner chamber portions for containing the air, having a height substantially of at least twice its width and having a substantially flat lower end and substantially flat side walls, so that the lower rectangular portion of the tire will be maintained in position between the small rim and the inner and outer relatively high tire wall abutting flanges, each preferably of substantially half the height of the tire, providing a structure from which it is almost impossible to remove the tire, so that on a blow-out the tire positively will not come out of position and be ripped to pieces by further operation of the vehicle.

Further advantages of my invention are the saving of wear on the car, due to the extra cushioning features provided by my tire, the tire at the same time giving a more comfortable ride, and reducing the amount of heat produced in the operation thereof, thus largely eliminating any premature deterioration of the tire, due to the excessive heat created as in present types of tires.

I am aware that others have provided many types of multichamber tires but have always provided flexible partition walls between the annular multichambers thereof. The great difficulty with these has been that when one chamber collapses, nature attempts to fill the vacuum with the nearest air present, which is the air in the opposite unpunctured or uncollapsed chamber which tends to expand to fill the vacuum and in accordance with Boyle's law, where two chambers are employed, doubles the volume of one cylindrical chamber to that of the two chambers, correspondingly reducing the pressure. Thus, if a two chamber tire is provided and both chambers be inflated to a pressure of 32 pounds, when the second chamber collapses, the expansion of air in the first chamber will bend over the flexible partition wall to cause the air in the first chamber to fill up the whole tire, thereby doubling its volume so that its pressure will be reduced substantially to half that amount, namely, to 16 pounds, an amount insufficient to support the vehicle on the tire in use, providing a pressure very close to atmospheric.

My invention contemplates the provision of a central partition wall which is rigid throughout at least the lower half thereof to greatly lessen the tendency of the air in the non-collapsed chamber to expand and increase its volume appreciably, thereby lowering its pressure to a dangerous amount. In other words, to provide a tire in which even if one chamber be collapsed, the other chamber will have enough air in it at sufficient pressure to at all times support the car so as to obviate the danger of blow-outs completely collapsing the tire and possibly wrecking the car and preventing the collapsed tire from coming off the rim, and providing at least a sufficient support in the tire so that the motor vehicle may be driven to the nearest garage for changing the tire.

Objects of my invention, therefore, are to provide a tire in which the danger inherent in blow-outs in present day tires is substantially eliminated and a tire in which even if a blow-out should occur, the tire itself will not become damaged or ruined while bringing the vehicle to a stop.

A further feature of my invention resides in the fact that I preferably extend the center partition wall of the tire below the end walls thereof, or so otherwise modify the lower portion of the center partition wall and adjoining portions of the wheel rim so that the lower end of the center wall will be positively locked in position at all times, even if one of its respective chambers has become collapsed.

A further object of my invention is to eliminate the necessity of jacking up a car on the road in order to change the tire after a blow-out or puncture.

A further object of my invention is to localize the pressure brought on the tire by passing over a stone, irregularity in the road, or other abutment to the area of contact, and not distribute the shock throughout the entire tire, which causes a recirculation of air throughout the entire tire, and thereby lessens the heat generated, providing cooler riding qualities in the tire and the generation of a lesser amount of heat to cause deterioration of the rubber; my invention thus maintaining a cool tire in use.

Further features of my invention relate to the particular structure of the tire employed and the modifications in the wheel and rim necessary to mount my improved tire thereon, all of which provide a construction which is simple and inexpensive to manufacture and one which may be readily and quickly mounted and dismounted in use.

These and such other objects of my invention as may hereinafter appear will be best understood from a description of the accompanying drawings, which illustrate embodiments thereof.

In the drawings,

Fig. 1 is a vertical sectional view through a tire and adjacent upper portion of a vehicle wheel constructed in accordance with one embodiment of my invention.

Fig. 2 is a sectional view of a portion of a wheel equipped with the embodiment of my invention shown in Fig. 1 along the line 2—2 of Fig. 1.

Fig. 3 is a vertical sectional view through a tire and adjacent upper portion of a vehicle wheel constructed in accordance with a different embodiment of my invention.

Fig. 4 is a sectional view of a portion of a wheel equipped with an embodiment of my invention shown in Fig. 3, taken along the line 4—4 of Fig. 3.

Fig. 5 is a vertical sectional view through a tire and adjacent upper portion of a vehicle wheel constructed in accordance with a different embodiment of my invention.

In the drawings, wherein like characters of reference generally indicate like parts throughout, 10, 10' and 10" generally indicate embodiments of vehicle wheels constructed in accordance with my invention.

As stated hitherto, my invention essentially comprises a novel type of pneumatic tire 12, 12', 12" generally oblong in section having an inner chamber portion 40, 40', 40", having a height of substantially twice its width, having a substantially flat inner end 13, 13', 13" and substantially flat side walls 24, 24', 24". The tire side walls 24, 24', 24" terminate in the flat lower ends 26, 26', 26" abutting the tire rim 16, 16', 16". As stated hitherto, the rim 16, 16', 16" is of much smaller radius than the usual tire rim by substantially the height of a normal tire, so that a tire of a standard width may be mounted thereon and still have twice the height or depth of a tire of a standard width.

I preferably so modify the rim 16, 16', 16" and wheel 10, 10', 10" as to provide an inner annular flange 52, 52', 52" projecting upwardly from the inner end of said rim of substantially half the height of the tire abutting the inner wall thereof and an outer annular flange 68, 68', 68" projecting upwardly from the outer end of said rim 16, 16', 16" detachably securable to said rim abutting the outer tire wall and also substantially half the height of said tire, said flanges providing with said rim, a groove for clamping the inner half of the tire therein, with the upper ends of said flanges extending at a radius from the center of the wheel substantially that of the usual rim and in effect providing a central groove 29, 29', 29" in the rim, having flat side walls extending downwardly a depth equal to the normal height of the tire above the standard rim. If desired, the rim 16, 16', 16" may be split into an inner rim portion 51, 51', 51" and into a rim outer portion 64, 64', 64", such as in the embodiments shown.

My improved tire 12, 12', 12", therefore, comprises an oblong annular casing or shoe 22, 22', 22" having the flat side walls 24, 24', 24" terminating in flat rim abutting lower ends 26, 26', 26". Said lower ends 26, 26', 26" may have a standard type of strengthening metal wire bead 28, 28" incorporated therein. The lower portions 31, 31', 31" of the side wall of the tire may be made of more rigid material than the upper portions 33, 33', 33" or they may, if desired, have reinforcing strengthening metal plates 35' secured to the inner and/or outer surfaces of the lower portions 31' of the tire wall as shown in the embodiment shown in Figs. 3 and 4 in any suitable manner as by vulcanizing them thereto, or suitably riveting or otherwise securing them thereto.

The tires may be provided with suitable valves 44, 44', 44", in the embodiments shown provided for this purpose in the suitably shaped inner tubes 49, 49', 49" shaped of the same general shape as the tire casings 22, 22', 22" to fit into the chambers 40, 40', 40" thereof.

In accordance with my invention, I provide an annular center wall 30 or 30' or 30" projecting downwardly centrally of the tread surface 32, 32' or 32" thereof, at least to the rim, preferably to below the rim as in the embodiments shown. As stated hitherto, I construct my improved center wall with a flexible upper portion 34, 34' or 34" and a rigid lower portion 36, 36' or 36", and the lower end thereof is provided with suitable locking means 38, 38', 38", adapted to be engaged with the annular locking means 20, 20', 20" in said rim 16, 16', 16" to maintain said lower end 36, 36', 36" in rigid position centrally of said rim 16, 16', 16" in use, providing complementary annular cushioning air chambers 40, 40' or 40" on each side of said center wall 30, 30' or 30". The lower portion 36, 36' or 36" of said center wall may be made rigid in any suitable manner. It may be made of rigid hard rubber or reinforced with metal such as by the metal bead 42 extending upwardly therein as in the embodiment shown in Fig. 5. I have shown one type of locking means 38 for the lower end 36 of said center wall 30 in the embodiment shown in Fig. 1, of a substantially different type in the embodiments shown in Figs. 3-6, which will now be described in detail for each embodiment, with the modifications of the rim necessary therefor. In all embodiments, the individual split chamber portions 40, 40', 40'' are provided, having the valves 44, 44', or 44'' for each chamber.

Due to the depth of the groove 29, 29', 29'' provided by my improved inner and outer flanges 52, 52', 52'' and 68, 68', 68'', it is obvious that I have provided a construction which positively will not be pulled out of its position in its groove 29, 29', 29'' by traffic after a blow-out and will also decrease the danger of having the tire "roll off" on turning a corner at excessive speeds.

I will now describe in detail the specific structure of the various embodiments shown, including the modifications of standard types of vehicle wheels and rims necessary for this purpose, although it is obvious that these specific constructions are merely illustrative of typical constructions employing the principles of my invention.

In all embodiments, the inner chamber portion 40, 40', 40'', including the two compartments, each of substantially half the size of the usual tire compartment, has a height of at least twice its width, has a substantially flat inner end 37, 37', 37'' and substantially flat side walls 39, 39', 39'', with its inner side wall 26, 26', 26'' abutting the inner flange 52, 52', 52'' throughout substantially half the height thereof and with said outer wall 26, 26', 26'' abutting said outer flange 68, 68', 68'' throughout substantially half the height thereof.

To detachably secure the tire 12, 12', 12'' to the rim 16, 16', 16'', I provide the outer flange 68, 68', 68'' also substantially of half the height of said tire abutting the outer wall of said tire and detachably securable to said rim. The lower half portions of the tire side walls 26 may be reinforced by having the metallic supporting plates 35' secured to the inner and outer surfaces thereof, if desired, such as to the side walls 26' in the embodiment shown in Fig. 3, or said side walls may be supported by a bead wire 151 as in the embodiment shown in Fig. 5.

As stated hitherto, the center walls may also be supported or made rigid throughout substantially the lower half 36, 36', 36'' thereof, if desired, by making them all hard rubber, much harder than the upper half in the flexible upper portions 34, 34', 34'', or said lower portions 36, 36', 36'' may be reinforced by the supporting plates 174, 174' on each side thereof, which may be either riveted thereto by the rivets 176 as in the embodiment shown in Figs. 1 and 2, or suitably vulcanized thereto, as in the embodiment shown in Figs. 3-5.

As stated, my invention comprises a modified disc wheel with a disc of relatively short height for this purpose. In all embodiments, I provide the annular disc 152, 152', 152'' projecting upwardly from the hub secured to the outer wall 154, 154', 154'' of said brake drum 134, 134', 134'' in any suitable manner, such as by the bolts 156, 156', 156''.

As also stated, I also preferably employ a split rim 16, 16', 16'' preferably centrally split into an inner rim portion 51, 51', 51'' of substantially half the width of the rim 16, 16', 16'', having an inner flange 52, 52', 52'' projecting upwardly from the inner end thereof and the outer rim portion 64, 64', 64'' of a width substantially half of the rim, having the outer annular flange 68, 68', 68'' projecting upwardly from the outer end thereof to abut the outer wall of the tire, of substantially the height of said inner flange, both flanges being preferably of substantially half the height of the tire, detachably securable to said inner rim portion 51, 51', 51''. As stated, a pneumatic tire 12, 12', 12'' of the particular shape hitherto described preferably has its lower half portion 29, 29', 29'' mounted between said flanges.

The embodiment shown in Figs. 1 and 2 comprises a vehicle wheel 10 comprising the annular disc 152 projecting upwardly from the hub or axle and secured to the outer wall 154 of the brake drum 134 in any suitable manner such as by the bolts 156, has the circumferentially spaced rim holding lugs 178 transversely split as at 179 projecting outwardly at intervals from the upper end thereof. The inner detachable rim portion 51 is of slightly less than half the width of the rim, having the inner tire abutting flange 52 projecting upwardly from the inner end thereof and has the axially circumferentially spaced transverse splines 180 projecting downwardly therefrom for insertion in the transverse channels 179 in said rim lugs 178 extending transversely of the lower portion thereof, and circumferentially spaced transverse holes 182 therein, having spaced cylindrical sockets 184 therein extending laterally inwardly centrally of said holes from the outer edges thereof.

The outer rim portion 64 is also of a width slightly less than half the rim and also has similarly circumferentially spaced transverse holes 186 therein and central cylindrical sockets 188 extending outwardly of said holes from the inner edges thereof and an outer flange 68 of substantially the height of said inner flange projecting outwardly from the outer end thereof. I provide a pneumatic tire 12 oblong in section and having the substantially flat side walls 24 terminating in flat ends 26 abutting said rim 16 and having an inner chamber portion 40, having a height of substantially twice its width, substantially flat side walls 39 and a central wall 30 extending from the outer tread surface 32 downwardly beyond the lower ends 26 of said flat side walls 24, having the flexible upper portion 34 and the rigid reinforced lower portion 36 and terminating in a laterally enlarged transversely extending cylindrical portion 190 which may, if desired, be made of more rigid material and mounted in the lower end thereof normal to said central wall, fitting into said female sockets 184 and 188 in the adjacent edges of said inner and outer rim portions 51 and 64 also having the aligned bolt holes 192 therein and the bolts 194 extending outwardly through said aligned circumferentially spaced transverse holes 182, 192 and 186 in said rim portions 51 and 64, and in said central cylindrical portion 190 to secure said rim portions together and said tire center wall 30 firmly to said rim at the lower end thereof and nuts 196 secured to the threaded outer ends of said bolts abutting the outer edge of said outer rim portion. I may, if desired, provide the supplemental annular locking rings 198 interposed between the side walls of said tire and said respective inner and outer locking flanges 52 and 68. Said locking rings 198 may also, if desired, be of substantially half the height of said tire as in the embodiment shown in Fig. 1, or they may be omitted entirely as in the embodiment shown in Fig. 5. If said locking rings are of a height substantially half that of the tire, the respective heights of the inner and outer locking flanges 52 and 68 may be correspondingly shortened as in the embodiments shown in Figs. 3 and 4.

I have shown substantially identical structures in the embodiment shown in Figs. 3 and 4 and in the embodiment shown in Fig. 5. In each instance, the wheel comprises the annular disc web 152', 152'' projecting upwardly from the hub, having an upper end terminating at a spaced distance inwardly of and above the brake drum 134', 134'', in the embodiments shown with said flange first projecting outwardly and upwardly as at 155', 155'', then straight outwardly for a short distance and then upwardly and having the inner rim portion 51', 51'' of slightly less than half the width of the tire projecting inwardly preferably integrally from the upper end thereof, having an inner tire flange 52' or 52'' projecting upwardly preferably integrally from the inner end thereof. Said rim portion 51' or 51'' has the radial slots 202' or 202'' extending upwardly through them, at circumferentially spaced distances thereof near the outer end thereof, the upper portion 204' or 204'' of said disc flange 156', 156'' having circumferentially spaced bolt holes 206', 206'' at intervals thereof aligned with said slots.

I provide the laterally extending outer rim portions 64' or 64'' of a width also of slightly less than half of the rim, having transverse slots 203', 203'' aligned with said slots 202', 202'' near the inner end thereof and the downwardly projecting web 208', 208'', having similar circumferentially spaced transverse bolt holes 210', 210'' therein and a lower end terminating in an inwardly projecting annular lower portion 212', 212'' below the space 214', 214'' between said flanges 204', 204'' and 208', 208'' depending from said rim portions 51', 51'' and 68' or 68'' respectively and an outer tire wall abutting flange 68' or 68'' projecting upwardly from the outer end thereof. A pneumatic tire 12' or 12'' characteristic of my invention is provided oblong in section and having substantially flat side walls 24' or 24'' terminating in flat ends 26' or 26'' abutting said rim portions 51' or 51'' and 64' or 64'' and having an inner chamber portion 40' or 40'' having a height of substantially twice its width, substantially flat side walls 39' or 39'' and a central wall 30' or 30'' extending downwardly from the outer tread surface 32' or 32'', and having a flat lower end 216', 216'' flush with the flat lower ends 26' or 26'' of said side walls 24' or 24'', having portions extending laterally of said lower end having circumferentially spaced radial slots 218', 218'' extending a distance upwardly therein adjacent the inner and outer edges thereof, aligned with said rim slots 202', 202'' and 203', 203'', and a central annular web 220', 220'' extending downwardly into the space 214', 214'' between said rim portions 51', 51'' and 64', 64'' and having similarly aligned transverse bolt holes 222', 222'' therein. Locking plates 224', 224'' are also provided having similarly aligned transverse bolt holes 226', 226'' therein and having the upper ends thereof inserted within said transversely spaced slots 202', 202'' and 203', 203'' in said inner and outer rim portions 51' or 51'' and 64' or 64'' and said slots 218', 218'' in said tire center wall. To secure said parts together, the bolts 228', 228'' extend through said aligned bolt holes 226', 226'', 206', 206'', 222', 222'', 210', 210'' and nuts 230', 230'' clamp the free ends of said bolts against said plates and webs and said abutting outer rim portion, lower portion and disc flange upper portion causing said outer flange 68', 68'' to clamp against the outer wall of the tire to clamp said tire against said inner flange 52', 52'' in the channel 29', 29'' formed by said flanges and clamping said locking plates 224', 224'' and oppositely split rim flange portions against the downwardly extending center wall web extensions 220', 220'' of said tire to firmly secure it thereto and, if desired, a supplemental annular locking ring 198' is interposed between said inner and outer rim flanges 52', 52'' and 68', 68'' and inner and outer side walls 26', 26'' of said tire as in the embodiment shown in Figs. 3-4. As stated, if desired, the annular locking ring 198' may be omitted as in the embodiment shown in Fig. 5.

As stated, however, if rings 198, 198' are used, the inner and outer rim flanges 52' or 52'' and 68' or 68'' may be made of less height so long as said annular locking rings 198, 198' are of substantially half the height of the tire, as in the embodiment shown in Fig. 3. However, said locking rings 198, 198' may be omitted, in which case the inner and outer flanges 52'' and 68'' are preferably constructed of substantially half the height of the tire and the outer walls of the tire may be reinforced, if desired, by the strengthening bead 151.

It is obvious that any of these tires with the constructions described may be readily, quickly and easily detached by merely loosening the bolts and removing the outer split rim portions in the embodiment shown in Figs. 3-5, or the respective flange 68 and locking ring 198 in the embodiment shown in Figs. 1 and 2, and that a tire may be readily mounted therein in a reverse manner.

It is apparent that I have provided a novel type of cushion tire with the advantages described above.

I employ the terms inner and outer in referring to the tire and wheel, with "inner" signifying the portion adjacent the vehicle and "outer" signifying the portion away from the vehicle.

I employ the words "upper" and "lower," "upwardly" and "downwardly," etc., relative to the radial position of the parts of the tire, "upper" signifying at a greater radial distance and "lower" signifying at a less radial distance in accordance with common automobile parlance instead of their more cumbersome, more accurate terms and despite the fact that the relative positions change on revolution of the tire, which, however, due to the fact that all parts of the tire are similar, makes no difference.

It is apparent that I have provided a novel type of wheel and tire construction with the advantages described above.

It is understood that my invention is not limited to the specific embodiments shown and that various deviations may be made therefrom without departing from the spirit and scope of the appended claims.

What I claim is:

1. A vehicle wheel comprising a rim, a pneumatic tire generally oblong in section, having an inner chamber, having a height substantially of at least twice its width and having substantially flat side walls and an annular center wall projecting inwardly substantially centrally of the tread surface thereof to the rim, dividing said chamber into two chambers, each alone capable of supporting the vehicle, said tire walls having flexible upper portions and substantially rigid lower portions and means to detachably secure said tire to said rim, including flanges projecting upwardly from said rim supporting the side walls of said tire for substantially half the height thereof.

2. A vehicle wheel, comprising a rim, a pneumatic tire oblong in section, and having substantially flat side walls terminating in flat rim abutting ends, and having an inner chamber having a height substantially of at least twice its width, substantially flat side walls and an annular center wall projecting downwardly substantially centrally of the tread surface thereof to the rim dividing said chamber into two chambers each alone capable of supporting the vehicle, said tire walls having flexible upper portions and substantially rigid lower portions, an inner annular flange projecting upwardly from the inner end of said rim of substantially half the height of said tire opposite the inner wall thereof and an outer annular flange on the outer end thereof also of substantially half the height of said tire detachably securable to said rim opposite the outer wall thereof, said flanges providing with said rim a groove for clamping the inner half of the tire therein.

3. A vehicle wheel, comprising a split rim, a pneumatic tire oblong in section, and having substantially flat side walls terminating in flat rim abutting ends, and having an inner chamber having a height substantially of at least twice its width, substantially flat side walls, and an annular center wall projecting downwardly substantially centrally of the tread surface thereof to the rim dividing said chamber into two chambers, each alone capable of supporting the vehicle, said tire walls having flexible upper portion and substantially rigid lower portions, an inner annular flange projecting upwardly from the inner end of said inner split rim portion of substantially half the height of said tire opposite the inner wall thereof and an outer split rim portion having an outer annular flange on the outer end thereof also of substantially half the height of said tire detachably securable to said rim inner portion opposite the outer wall thereof, said flanges providing with said rim a groove for clamping the inner half of the tire therein.

4. A vehicle wheel, comprising an annular disc flange adapted to project upwardly from the axle, having circumferentially spaced split rim holding lugs projecting outwardly at intervals therefrom, a detachable inner rim portion of slightly less than half the width of said rim, having an inner tire abutting flange projecting upwardly from the inner end thereof and axially circumferentially spaced transverse splines for insertion within said split rim extending transversely of the lower portion thereof, having circumferentially spaced transverse holes therein and having spaced cylindrical sockets extending laterally inwardly centrally of said holes from the outer edges thereof, an outer rim portion of a width slightly less than half the rim, also having similarly circumferentially spaced transverse holes, and central cylindrical sockets extending laterally outwardly of said holes from the inner edges thereof, and an outer flange of substantially the height of said inner flange projecting upwardly from the outer end thereof, a pneumatic tire oblong in section and having substantially flat side walls terminating in flat ends abutting said rim and having an inner chamber portion having a height of substantially twice its width, substantially flat side walls and a central wall extending from the outer tread surface thereof downwardly beyond the lower ends of said flat side walls, having a flexible upper portion and a rigid reinforced lower portion and terminating in a laterally enlarged transversely extending cylindrical portion fitting into said female sockets in the adjacent edges of said inner and outer rim portions, having aligned transverse bolt holes therein and bolts extending outwardly through said aligned circumferentially spaced transverse holes in said rim portions and said cylindrical portion of said tire center wall to secure said rim portions together and said tire center wall firmly to said rim and nuts secured to the threaded outer ends of said bolts, abutting the outer edges of said outer rim portion and supplemental annular locking rings interposed between said inner and outer rim flanges and the inner and outer side walls of said tire.

5. A vehicle wheel comprising an annular disc flange adapted to project upwardly from the axle, having circumferentially spaced split rim holding lugs projecting outwardly at intervals therefrom, a detachable inner rim portion of slightly less than half the width of said rim, having an inner tire abutting flange projecting upwardly from the inner end thereof and axially circumferentially spaced transverse splines for insertion within said split rim lugs extending transversely of the lower portion thereof, having circumferentially spaced transverse holes therein and having spaced cylindrical sockets extending laterally inwardly centrally of said holes from the outer edges thereof, an outer rim portion of a width slightly less than half the rim, also having similarly circumferentially spaced transverse holes, and central cylindrical sockets extending laterally outwardly of said holes from the inner edges thereof, and an outer flange of substantially the height of said inner flange projecting upwardly from the outer end thereof, a pneumatic tire oblong in section and having substantially flat side walls terminating in flat ends abutting said rim and having an inner chamber portion having a height of substantially twice its width, substantially flat side walls abutting said inner and outer flanges and a central wall extending from the outer tread surface thereof downwardly beyond the lower ends of said flat side walls, having a flexible upper portion and a rigid reinforced lower portion and terminating in a laterally enlarged transversely extending cylindrical portion fitting into said female sockets in the adjacent edges of said inner and outer rim portions, having aligned transverse bolt holes therein and bolts extending outwardly through said aligned circumferentially spaced transverse holes in said rim portions and said cylindrical portion of said tire center wall to secure said rim portions together and said tire center wall firmly to said rim and nuts secured to the threaded outer ends of said bolts abutting the outer edges of said outer rim portion.

JOHN B. DES ROSIERS.

References Cited in the file of this patent

UNITED STATES PATENTS

| Number | Name | Date |
| --- | --- | --- |
| 893,655 | Rempes | July 21, 1908 |
| 1,271,222 | Raflovich | July 2, 1918 |
| 1,435,566 | Vanderley | Nov. 14, 1922 |
| 1,574,277 | Conroy | Feb. 23, 1926 |
| 1,736,130 | Cloud | Nov. 19, 1929 |

FOREIGN PATENTS

| Number | Country | Date |
| --- | --- | --- |
| 528,300 | France | Nov. 9, 1921 |